Feb. 10, 1959 R. C. RÉMY 2,872,921
BREATHING REGULATOR WITH FLOAT-ASSISTED EXHALATION VALVE
Filed Nov. 26, 1957 2 Sheets-Sheet 1

INVENTOR.
RENE C. REMY
BY Lynn H Latta
ATTORNEY

Feb. 10, 1959 R. C. RÉMY 2,872,921
BREATHING REGULATOR WITH FLOAT-ASSISTED EXHALATION VALVE
Filed Nov. 26, 1957 2 Sheets-Sheet 2
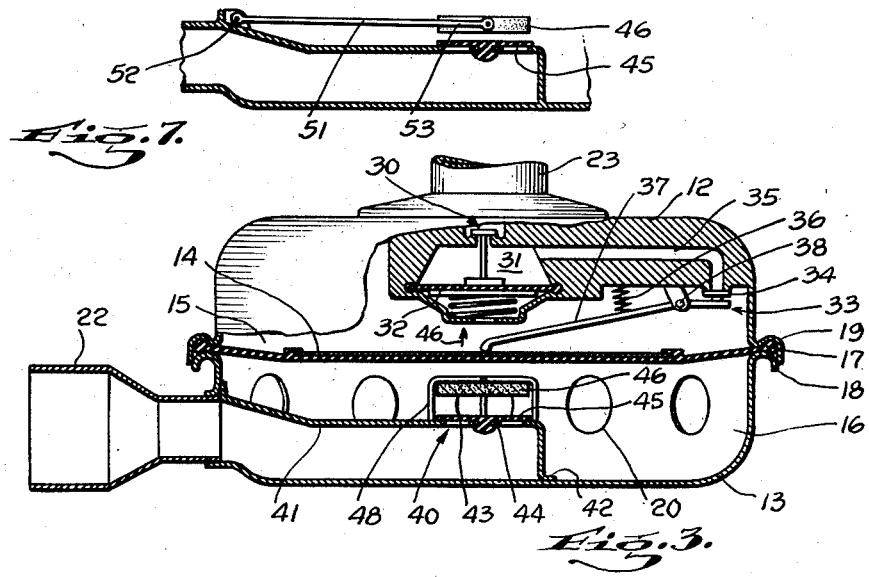
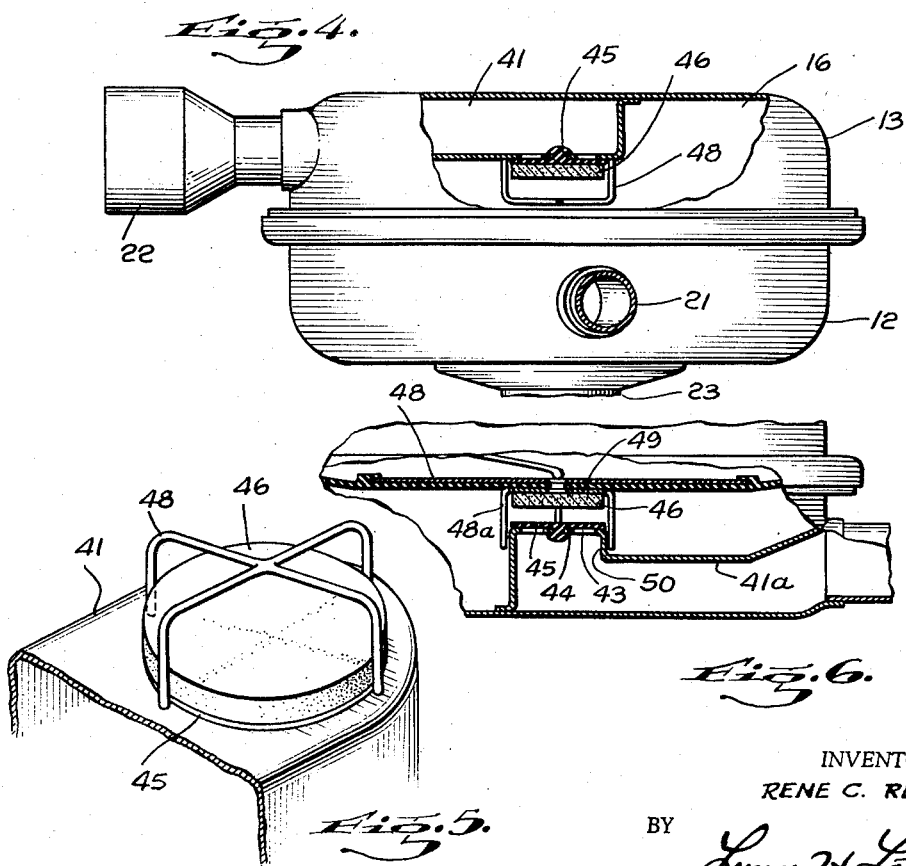
INVENTOR.
RENE C. REMY
BY
Lynn H Latta
ATTORNEY United States Patent Office 2,872,921
Patented Feb. 10, 1959

2,872,921
BREATHING REGULATOR WITH FLOAT-ASSISTED EXHALATION VALVE

René Charles Rémy, Paris, France

Application November 26, 1957, Serial No. 699,002

10 Claims. (Cl. 128—142)

This invention relates to underwater breathing apparatus of the open circuit type used by divers, wherein air from a high pressure container is supplied to the diver's lungs through a fitting that is attached to the diver's face, such as a mouthpiece or mask, an inhalation tube and a regulator including a demand-responsive inhalation valve mechanism for controlling the flow of the air at the proper pressure to balance the ambient hydrostatic pressure of the surrounding water at the depth at which the diver is operating; and wherein the waste gases including spent air and carbon dioxide from the diver's lungs are exhausted through the same mouthpiece and through an exhalation tube and valve; the regulator apparatus including both the inhalation and exhalation valve mechanism and controlling the inhalation and exhalation operations in response to the inhaling and exhaling effort of the diver's lungs.

Hitherto in this general type of regulator it has been considered necessary to locate the exhalation valve fairly close to the operative center of the diaphragm which controls the inhalation valve, in order to maintain proper control of exhalation without imposing too much of a strain upon the diver's lungs while assuring the proper closing of the exhalation valve upon cessation of exhalation flow from the diver's lungs, regardless of whether the regulator is in a normal upright position (upon the diver's back when normally face downward) or in an inverted position as when the diver turns over to face upwardly. In this respect it will be understood that in the normal position the exhalation valve in the usual breathing apparatus is above the level of the operative center of the diaphragm whereas in the inverted position it is an equal distance below that point. It will be obvious that some differential of ambient pressure over the normal mouthpiece pressure at the cessation of exhalation, will be required in order to effectively close the exhalation valve which is normally of the check valve type, responding to a pressure differential in the exhalation tube for opening the same. It is the practice in this common type of breathing apparatus to adjust the apparatus so that the diver's lungs, in order to open the exhalation valve during the exhalation effort, must exert a pressure differential which is directly related to the pressure necessary for operating the diaphragm sufficiently to open the inhalation valve during the inhalation effort, i. e., the exhalation valve is so positioned that the distance between it and the operative center of the diaphragm is less than the height of a column of water representing the pressure differential necessary for operating the diaphragm for inhalation. The inhalation valve apparatus is adjusted so as to require only a substantially minimum effort which will not be tiring upon the diver's lungs. In this conventional breathing apparatus, according to the formula stated above, the distance between the pressure sensitive mouth of the exhalation valve and the operative center of the diaphragm as measured in terms of a water column, represents even a smaller pressure differential, since, if it were greater, the pressure differential for holding the exhalation valve closed in the normal swimming position would be more than required whereas in the inverted position, the pressure differential would completely disappear and the exhalation valve would open automatically even during periods of inhaling effort, and would thus remain open constantly throughout the period of inverted swimming and would constantly leak air into the surrounding water.

It will be apparent that this formula for relating the position of the exhalation valve to the diaphragm, which is essential in the type of construction utilized in the conventional breathing apparatus, places fairly exacting limits upon the design characteristics of such apparatus, including the placement of parts and dimensions etc., and because of such close limits, the engineering and servicing requirements are fairly exacting and do not afford much latitude for an inexpensive type of production operation in the fabrication of the apparatus nor much latitude for variations in adjustment of the apparatus without requiring servicing for readjusting the apparatus and restoring it to satisfactory operating condition.

With the foregoing problems in mind, this invention has as its general object to provide a breathing apparatus of the general type utilizing separate inhalation and exhalation valves in a regulator connected to a mouthpiece by separate inhalation and exhalation tubes in an open circuit arrangement, characterized by the provision of improved control means which eliminates the necessity for observing the formula for maintaining the exhalation valve within a limited distance from the operative center of the diaphragm.

More specifically, my invention aims to provide a breathing apparatus of this type embodying an improved exhalation valve which can be located at any selected distance from the operative center of the diaphragm.

Another object is to provide a breathing apparatus of the type outlined, embodying an improved exhalation valve which is adapted to control exhalation with a smaller requirement for exhalation effort on the part of the diver's lungs, thus making the apparatus easier and less tiring for the diver.

Other objects and advantages will become apparent in the ensuing specification and drawings in which:

Fig. 3 is a side view of the regulator with the exhalation chamber and exhalation valve thereof shown in section, in the normal operating position of the regulator;

Fig. 4 is a side view of the regulator in its inverted position of operation with the exhalation chamber broken away and the exhalation valve shown in section;

Fig. 5 is an enlarged perspective view of the exhalation valve unit;

Fig. 6 is a fragmentary sectional view of a regulator embodying a modified form of the invention; and Fig. 7 is a fragmentary sectional view of another modified form of the invention.

Figure 1:
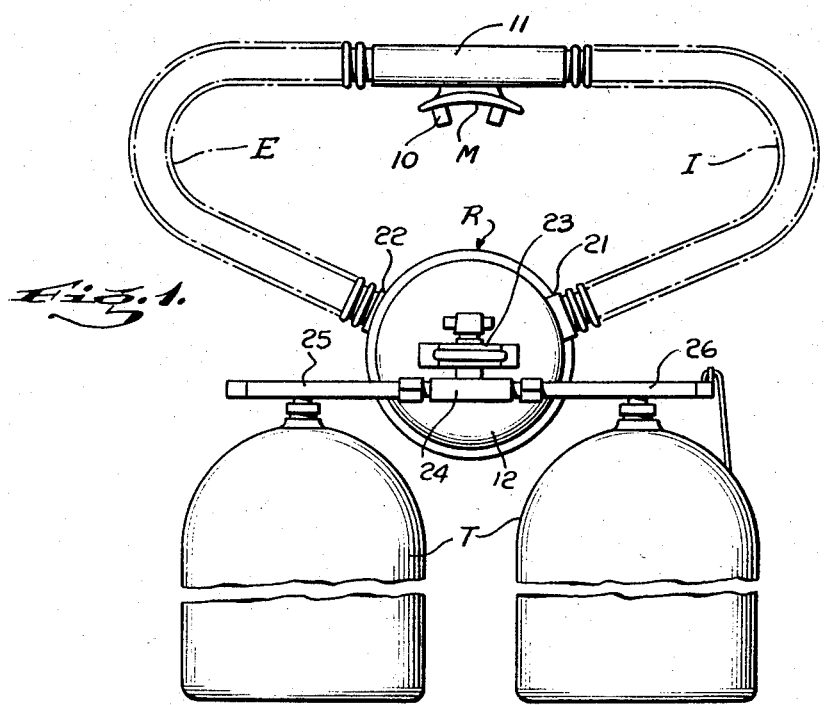
Fig. 1 is a schematic view of a breathing apparatus embodying the invention.
Figure 2:
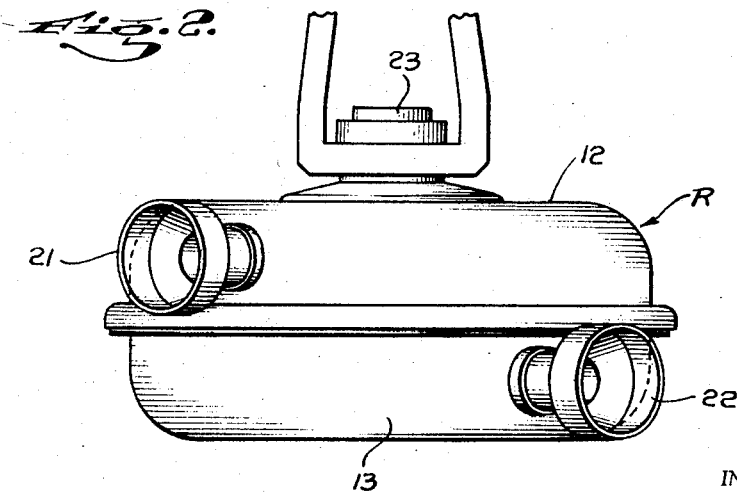
Fig. 2 is a side view of the regulator.

Referring now to the drawings in detail, and in particular to Fig. 1, I have shown therein, as an example of one form in which the invention may be embodied, a breathing apparatus embodying a regulator R, a mouthpiece M, an inhalation tube I connecting the mouthpiece to an inhalation metering demand valve unit in the regulator (customarily referred to as the regulator valve), and exhalation tube E connecting the mouthpiece to an exhalation valve in the regulator, and a brace of air pressure tanks T which are connected to the regulator for supplying air under pressure thereto in response to the demand action of the regulator valve.

The mouthpiece M may be of the type commonly utilized in conventional breathing apparatus, including lugs 10 to be gripped between the diver's teeth for holding the mouthpiece in the diver's mouth; or may optionally be a face mask. The inhalation and exhalation tubes I and E are of lightweight flexible corrugated hose or conduit of waterproof material. The mouthpiece 10 is equipped with a T-head 11 the respective ends of which are coupled to the respective conduits I and E.

Regulator R (Fig. 3) embodies a casing assembly including respective drum-shaped casing sections 12 and 13 separated by a diaphragm 14 and defining therewith respective inhalation and exhalation chambers 15 and 16. In accordance with conventional construction, the rim 17 of the diaphragm may be clamped between rim flanges 18 and 19 on the respective casing sections, may be secured by suitable fastener devices (not shown) and may function as a gasket to seal the diaphragm to the casing sections, particularly to the section 12 so as to hermetically seal the chamber 15 from the surrounding medium. The exhalation chamber 16, in the operation of the regulator, is substantially filled with the surrounding water, which has free access to the chamber 16 through openings 20 in the casing section 13.

Secured in the lateral walls of the respective casing sections 12 and 13 are inlet and outlet connection fittings 21 and 22 respectively to which the ends of the respective conduits I and E are attached and sealed. Connected to the center of the end wall of casing section 12 and communicating with the inhalation chamber 15 is an air pressure supply fitting 23 to which is connected, through a T-fitting 24, the respective connecting tubes 25 and 26 for conveying air under pressure from the respective tanks T. Manual valves in the neck fittings of the respective tanks may be opened or closed as required in order to connect one or the other of the tanks to the regulator, it being understood that it is customary to utilize a second tank as a reserve tank. The connections between the tanks and the air supply inlet of the regulator is conventional and forms no part of the present invention.

The inhalation valve mechanism, shown in Fig. 3, may be a conventional combination of pressure reducing valve unit 30 and demand valve 31, the former controlling the flow of compressed air through the inlet fitting 23 into an intermediate pressure chamber 31 and being actuated by a diaphragm 32 which responds to fluctuations in the intermediate pressure of chamber 31. The demand valve 33 may include a valve head 34 engaging a valve seat at the mouth of a passage 35 coming from the intermediate pressure chamber 31, spring urged into such seating engagement by suitable spring loading means 36, and actuated by a lever 37 pivoted at 38 to the housing section 12 and bearing against the center of diaphragm 14, approximately as shown. It will be understood that such a two-stage inhalation valve mechanism is in itself a conventional arrangement and that the details thereof do not constitute a part of the present invention. In lieu of such a two-stage valve arrangement the invention contemplates the possibility of utilizing a single demand valve directly subjected to the tank pressure of inlet 23 tending to close the valve and opened by a lever arrangement of proper leverage ratio actuated by the diaphragm 14, as disclosed in my co-pending application Serial No. 699,003, filed concurrently herewith. In any event, the inhalation valve mechanism must be such as to embody a slight closing pressure differential against the valve, over the tank pressure at inlet 23, which differential is overcome by the pressure applied to the demand valve lever 37 by diaphragm 14 in response to a reduction of pressure in the inhalation chamber 15 produced by the inhaling effort of the diver applied to that chamber through the inhaling connection 21.

In combination with a regulator valve mechanism of the general type outlined above, the present invention provides the improved exhalation valve mechanism which is indicated generally at 40 in the drawings. The exhalation valve mechanism 40 includes a throat 41 communicating with the exhalation outlet 22 and extending into the exhalation chamber 16. Throat 41, as indicated, may be defined between the head of housing section 13 and a stamping (Fig. 5) of channel section having a rim 42 extending along both sides thereof throughout its length and around its inner end and suitably attached and sealed to the housing section 13. At its inner end, throat 41 has a valve port 43 (which may comprise a series of apertures arranged in annular array in a spider section of the throat 41 having a central hub portion 44 to which is secured a valve element 45 in the form of a disc of thin flexible material, normally seated against the valve seat defined around the periphery of the port 43 and constituting what is commonly known as a diaphragm valve.

The valve 45 is arranged to open in the direction of the demand valve opening movement of diaphragm 14, indicated by arrow 46, the valve seat facing in that direction. The valve 45 is spaced away from the plane of diaphragm 14 on the remote side thereof from the inhalation chamber 15. This is true regardless of whether the escape valve 45 is disposed, as shown in the drawing, substantially at the axis of the center of the diaphragm or in the position displaced from said axis in a radial direction. In fact, the invention makes it possible for the position of the exhalation valve to be located at any selected distance radially from the axis of the diaphragm so long as the escape valve is spaced axially from the plane of the diaphragm in the direction opposite to the direction of valve opening $i$ of the diaphragm 14. Preferably, the valve 40 is located within the exhalation chamber 16, although not necessarily.

Associated with the valve 45 is a float 46 which may be in the form of a disc of buoyant material (such as uni-cellular foamed styrene plastic or other foamed material). A suitable means for retaining float 46 in opposed, centered relation to valve 45 is likewise provided. Such means may comprise a cage 48 attached to the valve seat face of throat 41, and providing a rest against which the float 46 may be positioned in opposed, spaced parallel relation to the valve 45 as shown in Fig. 3.

In the normal position of operation of the regulator shown in Fig. 3, the float 46 will float away from valve 45 and aganist the cage 48 as shown, permitting the exhalation valve to operate freely and independently of the float in a position below the level of diaphragm 14. There is a sufficient differential of hydrostatic pressure at this lower level over the hydrostatic pressure at the level of inhalation chamber 15 to maintain the valve closed as against the median pressure in the throat 41 (when the diver is neither inhaling nor exhaling). It will be apparent that the pressure in throat 41 corresponds to the pressure in chamber 15 as regulated by demand valve 33.

In the inverted position of operation shown in Fig. 4, the float 46 will rise against the exhalation valve 45 (which is now above the cage 48) and will exert closing pressure against the valve. The calculated buoyancy of the float 46 is sufficient to compensate for the change in the hydrostatic pressure differential (from positive to negative) acting against the valve 45 as between the normal position of Fig. 3 and the inverted position of Fig. 4, and is preferably just sufficient to maintain the valve closed in the inverted position (overcoming the negative differential tending to open the valve) so that only a very slight exhalation effort is required on the part of the diver to open the valve 45 against the buoyancy loading of the float 46.

It will now be apparent that the invention makes it possible to adjust the pressure differential so that in the normal position of operation of Fig. 3, the closing pressure differential against exhalation valve 45 over the median pressure in throat 41 and inhalation chamber 15, need be only a very slight differential so that the exhalation effort of the diver in the normal position, required for opening the exhalation valve, may be so slight as to be unnoticeable to the diver. Furthermore it will be apparent that by the proper selection of the buoyancy of float 46, the exhalation effort required for opening the valve in either the normal or the inverted position may be at a minimum value and substantially unnoticeable.

The invention also makes it possible to locate the exhalation valve 45 at a distance from the diaphragm 14 along the axis of the regulator outside of the range within which the exhalation valve position is restricted in the conventional breathing apparatus. In this connection, it may be noted that an essential requirement in the invention is this: that the exhalation valve be positioned on the opposite side of the plane of the main diaphragm 14 from inhalation chamber 15 and the inhalation valve mechanism therein. The distance to which the exhalation valve may be spaced below the diaphragm in the normal operating position is of course limited by the fact that as this distance increases, additional exhalation effort will be required to open the valve 45 because of the increase in the hydrostatic pressure differential at the lower level over the pressure in inhalation chamber 15 which is adjusted to the proper value to inflate the diver's lungs at the pressure of the water acting against his lungs. As the spacing of the exhalation valve below the diaphragm is increased, the buoyancy of float 46 is correspondingly increased so as to compensate for the greater change in differential as between the normal and the inverted positions, and to maintain a slight closing pressure against the valve in the inverted position.

Fig. 6 illustrates a modified form of the invention wherein the float 46, in the normal position of operation of the regulator, is adapted to exert a buoyancy pressure against the diaphragm to reduce the amount of inhalation effort required for opening the demand valve 33. In the inverted position of operation, the float 46 will act to maintain a closing pressure against the exhalation valve 45 the same as in the previously described form of the invention. The means for retaining the float 46 in operative position may in this case be an open cage 48a comprising a series of four or more fingers formed integrally with a web 49 of disc form attached to the diaphragm 14, the fingers projecting axially from the web 49 in an annular array surrounding an axially projecting cylindrical head portion 50 of the throat 41a, the valve seat being formed in the end of head portion 50 as part of a spider having valve ports 43 and a central hub portion 44 to which the valve 45 is attached. As the diaphragm 14 moves in a breathing movement of the regulator, the fingers of cage 48a may slide in telescoping relation to the head 50 of the exhalation valve throat 41a.

Fig. 7 discloses still another modification of the invention wherein the means for guiding and retaining the float 46 in opposed relation to exhalation valve 45 may be an arm 51 pivoted to the throat 41 at 52 for swinging movement and having at its free end a fork 53 in which the float 46 is pivotally mounted for automatic adjustment to the plane of the valve 45 in the inverted position of operation and to the plane of diaphragm 14 against which it may exert a differential-reducing load in the normal position of regulator operation, the same as in Fig. 6.

I claim:

1. In a regulator for controlling flow of breathable gas from a source of such gas under pressure to a fitting that is attachable to a diver's face in communication with his lungs, through an inhalation conduit extending from the regulator to such fitting, and for controlling the escape of expired gas from said fitting into a body of water in which the diver is immersed, through an exhalation conduit extending from said fitting to said regulator, in combination: a casing having an inlet for receiving the compressed gas from said source and an inhalation outlet for delivering the gas to said inhalation conduit; a diaphragm cooperating with said casing to define an inhalation chamber in communication with said inlet and outlet, through which the compressed gas is metered from said source to said inhalation conduit in response to suction applied to said chamber by the diver's inhalation; a normally closed demand valve controlling the flow through said inlet; means for opening said demand valve in response to inhalation-induced inward movement of said diaphragm; and exhalation-escape valve mechanism disposed externally of said inhalation chamber, including a throat connected to said exhalation conduit, said throat having a valve seat defining an escape port facing in the direction of said inhalation-induced inward movement of said diaphragm, a valve adapted to engage said seat to close said escape port, means for positioning said valve with respect to said seat, a float, and means retaining said float in opposed relation to said valve element, rendering said float operable to assume a floating position withdrawn from operative association with said valve element when the regulator is in a normal upright position wherein said inhalation chamber is above the diaphragm and to engage the valve element and lift it into engagement with said valve seat when the regulator is in an inverted underwater position.

2. In a regulator for controlling flow of breathable gas from a source of such gas under pressure to a fitting that is attachable to a diver's face in communication with his lungs, through an inhalation conduit extending from the regulator to such fitting, and for controlling the escape of expired gas from said fitting into a body of water in which the diver is immersed, through an exhalation conduit extending from said fitting to said regulator, in combination: a casing having an inlet for receiving the compressed gas from said source and an inhalation outlet for delivering the gas to said inhalation conduit; a diaphragm cooperating with said casing to define an inhalation chamber in communication with said inlet and outlet, through which the compressed gas is metered from said source to said inhalation conduit in response to suction applied to said chamber by the diver's inhalation; a normally closed demand valve controlling the flow through said inlet; means for opening said demand valve in response to inhalation-induced inward movement of said diaphragm; and exhalation-escape valve mechanism disposed externally of said inhalation chamber, having a throat connected to said exhalation conduit, said throat having a valve seat defining an escape port facing in the direction of said inhalation-induced inward movement of said diaphragm, a valve adapted to engage said seat to close said escape port, a retainer disposed in spaced relation to said valve in said direction of inward diaphragm movement, and a float disposed between said valve element and said retainer in floating relation thereto, said float being operable to assume a floating position in contact with said retainer means and withdrawn from operative association with said valve element when the regulator is in a normal upright position wherein said inhalation chamber is above the diaphragm and to engage the valve element and lift it into engagement with said valve seat when the regulator is in an inverted underwater position.

3. In a regulator for controlling flow of breathable gas from a source of such gas under pressure to a fitting that is attachable to a diver's face in communication with his lungs, through an inhalation conduit extending from the regulator to such fitting, and for controlling the escape of expired gas from said fitting into a body of water in which the diver is immersed, through an exhalation conduit extending from said fitting to said regulator, in combination: a casing having an inlet for receiving the compressed gas from said source and an inhalation outlet for delivering the gas to said inhalation conduit; a diaphragm cooperating with said casing to define an inhalation chamber in communication with said inlet and outlet, through which the compressed gas is metered from said source to said inhalation conduit in response to suction applied to said chamber by the diver's inhalation; a normally closed demand valve controlling the flow through said inlet; means for opening said demand valve in response to inhalation-induced inward movement of said diaphragm; and exhalation-escape valve mechanism disposed externally of said inhalation chamber, having a throat connected to said exhalation conduit, said throat having a valve seat defining an escape port facing in the direction of said inhalation-induced inward movement of said diaphragm, a diaphragm valve disc attached to said throat and normally engaging said seat to close said escape port, a float, and means retaining said float in substantially coaxial relation to said valve disc in floating relation thereto, said float being operable to assume a floating position withdrawn from operative association with said valve disc when the regulator is in a normal upright position wherein said inhalation chamber is above the diaphragm and to engage the valve element and lift it into engagement with said valve seat when the regulator is in an inverted underwater position.

4. In a regulator for controlling flow of breathable gas from a source of such gas under pressure to a fitting that is attachable to a diver's face in communication with his lungs, through an inhalation conduit extending from the regulator to such fitting, and for controlling the escape of expired gas from said fitting into a body of water in which the diver is immersed, through an exhalation conduit extending from said fitting to said regulator, in combination: a casing having an inlet for receiving the compressed gas from said source and an inhalation outlet for delivering the gas to said inhalation conduit; a diaphragm cooperating with said casing to define on one side of said diaphragm inhalation chamber in communication with said inlet and outlet, through which chamber the compressed gas is metered from said source to said inhalation conduit in response to suction applied to said chamber by the diver's inhalation; a normally closed demand valve controlling the flow through said inlet; actuator means for opening said demand valve in response to inhalation-induced inward movement of said diaphragm; an exhalation valve spaced from the plane of the diaphragm on the other side thereof, said exhalation valve having a valve seat defining an escape port facing toward said plane of said diaphragm, and including a valve element adapted to engage said seat to close said escape port; a retainer disposed between said valve seat and said plane of the diaphragm; and a float disposed between said valve element and said retainer in floating relation thereto, said float being operable to assume a floating position in contact with said retainer and away from operative association with said valve element when the regulator is in a normal upright underwater position wherein said escape valve is below the plane of the diaphragm and to engage the valve element and to exert a seating load thereagainst when the regulator is in an inverted underwater position.

5. In a regulator for controlling flow of breathable gas from a source of such gas under pressure to a fitting that is attachable to a diver's face in communication with his lungs, through an inhalation conduit extending from the regulator to such fitting, and for controlling the escape of expired gas from said fitting into a body of water in which the diver is immersed, through an exhalation conduit extending from said fitting to said regulator, in combination: a casing having an inlet for receiving the compressed gas from said source and an inhalation outlet for delivering the gas to said inhalation conduit; a diaphragm cooperating with said casing to define on the inner side of said diaphragm an inhalation chamber in communication with said inlet and outlet, through which chamber the compressed gas is metered from said source to said inhalation conduit in response to suction applied to said chamber by the diver's inhalation; a normally closed demand valve controlling the flow through said inlet; means for opening said demand valve in response to inhalation-induced inward movement of said diaphragm; an exhalation valve disposed externally of said inhalation chamber on the outer side of said diaphragm in spaced opposed relation to the central area thereof, said exhalation valve having a valve seat defining an escape port facing toward the diaphragm and including a valve element adapted to engage said seat to close said escape port; a retainer disposed between said valve seat and said diaphragm; and a float disposed between said valve element and said diaphragm and retained by said retainer in opposed floating relation thereto, said float being operable to assume a floating position away from operative association with said valve element when the regulator is in a normal upright underwater position wherein said escape valve is below the diaphragm, and to engage the valve element and to apply a valve seating load thereto when the regulator is in an inverted underwater position.

6. A regulator as defined in claim 5, wherein said retainer is in the form of a cage attached to said valve seat and having a head portion disposed between and parallel to said seat and diaphragm, for supporting said float out of contact with either said valve element or said diaphragm in the said floating position of the float.

7. A regulator as defined in claim 5, wherein said retainer includes a web portion attached to said outer side of the diaphragm and a plurality of retainer fingers disposed in annular array around the axis of said valve seat and projecting into operative association therewith to define a retaining area in which said float is confined for floating movement axially between said valve seat and the diaphragm, said float, in said floating position, engaging said web to exert against the diaphragm lifting force for reducing the inhalation effort required for opening said demand valve.

8. In a regulator for controlling flow of breathable gas from a source of such gas under pressure to a fitting that is attachable to a diver's face in communication with his lungs, through an inhalation conduit extending from the regulator to such fitting, and for controlling the escape of expired gas from said fitting into an ambient body of water in which the diver is immersed, through an exhalation conduit extending from said fitting to said regulator, in combination: a casing comprising an imperforate first casing section having an inlet for receiving the compressed gas from said source and an inhalation outlet for delivering the gas to said inhalation conduit, and an apertured second casing section; a diaphragm interposed between said casing sections and cooperating with said first casing section to define an inhalation chamber in communication with said inlet and outlet, through which the compressed gas is metered from said source to said inhalation conduit in response to suction applied to said chamber by the diver's inhalation, said diaphragm cooperating with said second casing section to define an exhalation chamber in open-communication with said ambient body; a normally closed demand valve controlling the flow through said inlet; means in said inhalation chamber for opening said demand valve in response to inhalation-induced inward movement of said diaphragm; an exhalation escape valve disposed in said exhalation chamber, having a throat connected to said exhalation conduit, said throat having a valve seat defining an escape port facing the outer side of said diaphragm, and including a valve element adapted to engage said seat to close said escape port, a retainer disposed between said throat and said diaphragm for positioning said valve element with respect to said seat, and a float disposed between said valve element and said retainer in floating relation thereto, said float being operable to assume a floating position in contact with said retainer and away from operative association with said valve element when the regulator is in a normal upright position wherein said escape valve is below the diaphragm and to engage the valve element and lift it into engagement with said valve seat when the regulator is in an inverted underwater position.

9. A regulator as defined in claim 7, wherein said retainer is attached to said throat and in spaced relation to said diaphragm.

10. A regulator as defined in claim 9, wherein said retainer is attached to said diaphragm and wherein said float is operative in said normal position of the regulator to exert a lifting force against the diaphragm to reduce the inhalation effort, required for opening said inhalation valve.

References Cited in the file of this patent

FOREIGN PATENTS

| | | |
|---|---|---|
| 201,171 | Australia | Feb. 24, 1956 |
| 160,519 | Sweden | Sept. 17, 1957 |